United States Patent [19]

Bedsole

[11] Patent Number: 4,711,000
[45] Date of Patent: Dec. 8, 1987

[54] HANDS-FREE CLAMPING DEVICE FOR HOLDING FISH OR GAME FOR CLEANING

[76] Inventor: Jaye M. Bedsole, 16201 S.W. 283rd St., Homestead, Fla. 33030

[21] Appl. No.: 864,505

[22] Filed: May 19, 1986

[51] Int. Cl.⁴ ............................................. A22C 25/06
[52] U.S. Cl. ....................................................... 17/70
[58] Field of Search ....................... 17/70, 21, 44, 44.2, 17/44.3

[56] References Cited

U.S. PATENT DOCUMENTS

| | | |
|---|---|---|
| 1,259,109 | 3/1918 | Kugler et al. |
| 1,632,194 | 6/1927 | Possehl |
| 1,962,570 | 6/1934 | Nelson et al. |
| 2,197,206 | 4/1940 | Curtis |
| 2,686,334 | 8/1954 | Miller |
| 2,838,787 | 6/1958 | Hickey ................................. 17/70 |
| 3,713,189 | 1/1973 | Tkachuk ............................... 17/70 |
| 3,753,270 | 8/1973 | Hellebusch ........................... 17/70 |
| 3,968,588 | 7/1976 | Peterson, Sr. ..................... 17/70 X |

Primary Examiner—Willie G. Abercrombie
Attorney, Agent, or Firm—Julian C. Renfro

[57] ABSTRACT

A hands-free clamping fixture in accordance with my invention for immobilizing a fish or animal carcass to enable the cleaning and/or descaling thereof comprises a base member, and a movable clamping device interacting therewith. The base member has a work surface, and the movable clamping device principally comprises a component of generally U-shaped configuration. This component has a base portion and a pair of arms, and in operation is inverted such that the arms extend downwardly away from the base portion, with the arms being guided with respect to the sides of the work surface. A foot operated arrangement is employed for causing the base portion of the inverted U-shaped component to selectively move into a tightly clamping relation with the work surface, so as to firmly grasp and hold a portion of fish or animal that has been placed on the work surface.

16 Claims, 7 Drawing Figures

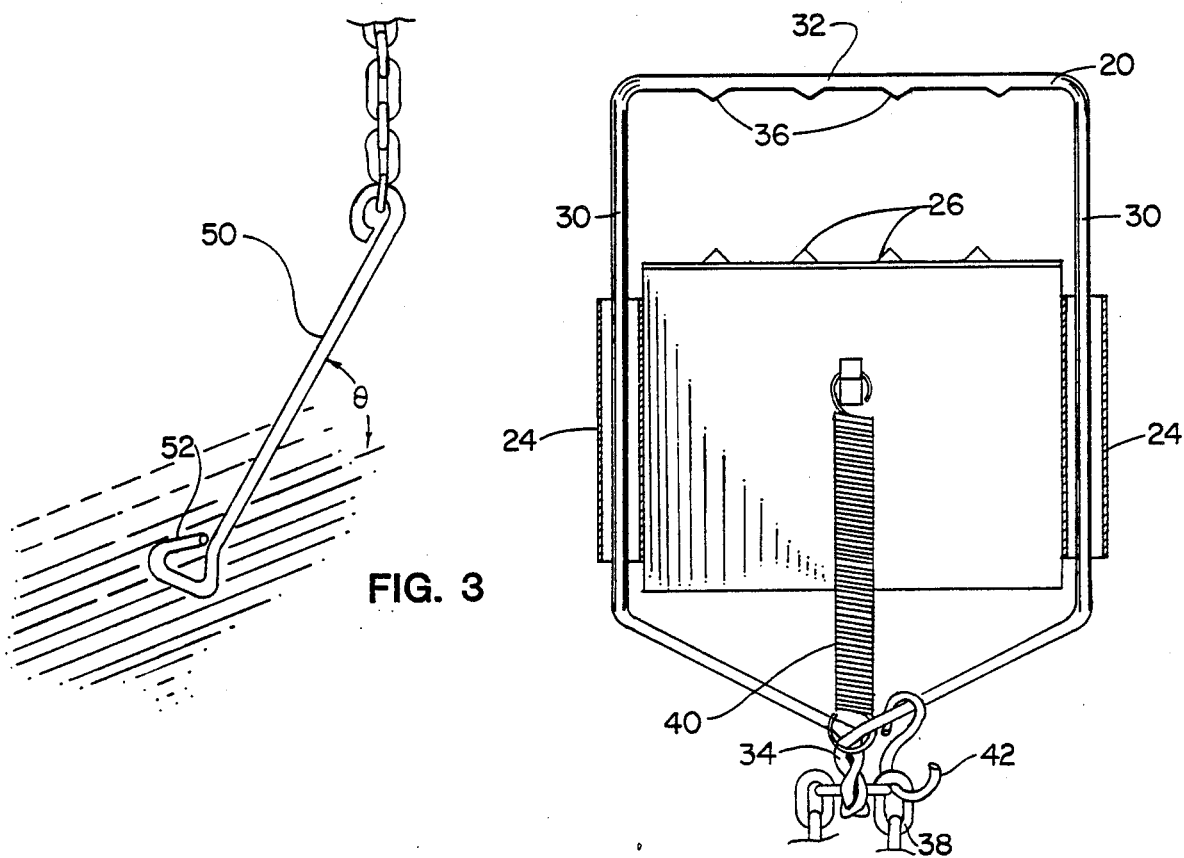

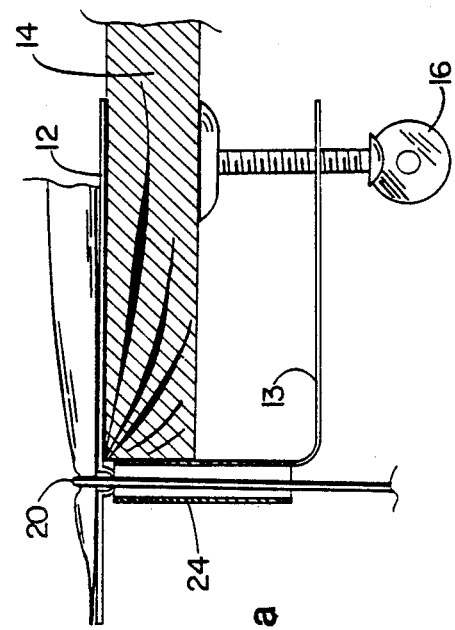
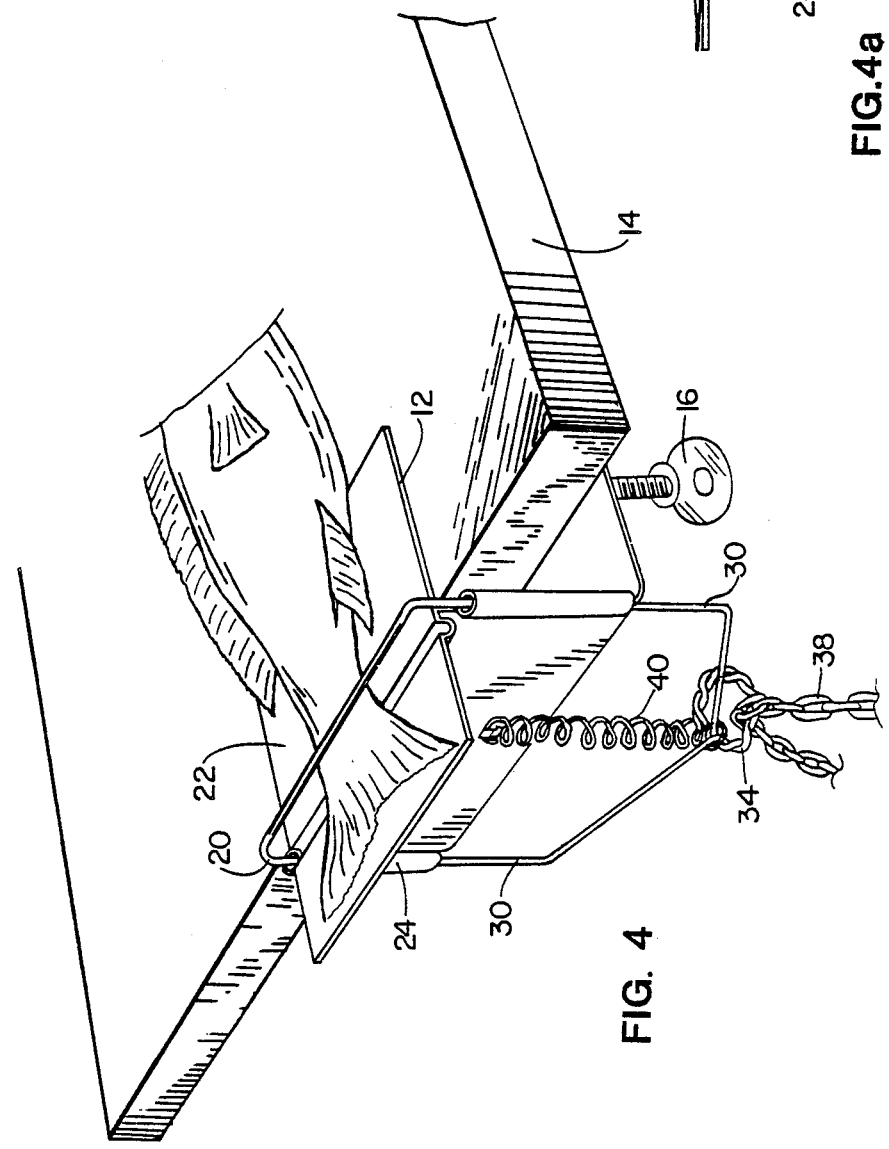
FIG. 4a
FIG. 4

HANDS-FREE CLAMPING DEVICE FOR HOLDING FISH OR GAME FOR CLEANING

BACKGROUND OF THE INVENTION

In the past, many devices have been proposed for clamping the tail of a fish, or a portion of a fowl or small mammal carcass, in order that the fish or other animal can be immobilized to prevent its slippage during the cleaning and/or descaling or skinning of the animal, but in each known instance, these prior art devices were unwieldy, expensive, and caused the cleaning and/or scaling operation to be a slow, tedious task.

Various types of clamping arrangements have been proposed for use in these devices, these including different types of spring-biased means as well as over-center cam type components that achieved a form of locking action upon the tail of the fish or the animal carcass.

A fixed amount of clamping pressure was usually involved in these earlier arrangements, however, which meant that sometimes the clamping pressure was so tight as to actually sever the tail, with such a tightly grasping clamp also being very difficult for a young person or a lady to use. On the other hand, if the clamping pressure was not great enough, the animal or fish being cleaned or descaled would slip out of the fixture, thus consuming a tangible amount of time before the fish or other animal could be reclamped.

A further problem involved the wasting of a finite amount of time due to these prior art devices requiring two hands for the clamping operation, meaning that the fish or other animal had to be lifted into the desired position, then released so that both hands could be utilized in the procedure of securing the fish, fowl or mammal by the clamping means.

A still further problem involved the user selecting between the alternatives of a long setup time, or else the dedication of the table or bench upon which the prior art device was used over to its exclusive use for fish and animal cleaning, descaling or skinning, as the case may be.

It was to overcome these and other disadvantages of the prior art that the present invention was evolved.

SUMMARY OF THIS INVENTION

In accordance with this invention, I have provided a hands-free clamping fixture for immobilizing a fish or animal carcass to enable the efficient cleaning and/or the descaling thereof, comprising a base member adapted to be readily and removably affixed to the edge of a table, bench, or other supporting surface. The base member I prefer to use for the fixture has a work surface thereon, with guide means used on each side of the work surface. A movable clamping device interacts with the base member, and this clamping component is preferably of generally U-shaped configuration.

The U-shaped component has a base portion and a pair of arms perpendicular to the base portion, with the U-shaped component being inverted such that the arms extend downwardly away from the base portion. Advantageously, the arms are guided by, and have a slidable relation with, the guide means on each side of the work surface portion of the base member.

I prefer to use a foot operated means to bring about the inverted U-shaped component moving into a clamping relationship with the work surface of the base member, which of course means that both of the user's hands can be left free to lift off the previously cleaned fish or animal from the fixture, then to reach for another animal to be cleaned, and thereafter to place the tail of the next fish, or some suitable part of the animal's body on the work surface preparatory to the clamping thereof by the movable U-shaped component.

It is most important to note that my highly advantageous device does not require that a table or bench be dedicated to the use of this invention, such that the table or bench could be used for no other purpose. Rather, the base member of my hands free fixture can be provided with a readily manipulated securing or affixing means such that the fixture can be taken off a shelf or other storage location, and then immediately and effortlessly secured to the table or bench, after which my fixture is ready for use. Then, at the conclusion of the cleaning and/or descaling operation, the bench or table can be promptly returned to its previous use.

Another of the important features of my invention is the small amount of space that is required for its storage, for none of the constituent parts of my clamping device are of large size. I prefer to have the downwardly extending arms of the U-shaped component joined together at their lower ends, with a short length of chain attached to the joinder location. The chain is long enough to dangle down almost to the floor, with a novel foot pedal in accordance with this invention attached to a selected location on the chain. As a result of the foot pedal being placed at an appropriate angle to the floor, upon foot pressure being applied to the pedal, the U-shaped component can be caused to descend against a spring bias into a tightly clamping relationship with the work surface, so that the fish or game animal will be suitably immobilized.

It is important to note that the foot pedal need not be a bulky, difficult to store and expensive device, but rather can be a simple piece of metal having means at one end such that the most appropriate link of the chain can be hooked. The chain in effect becomes responsible for holding the foot pedal in the location in which it forms a desirable angularity with the floor. Thus, a very simple, inexpensive foot pedal type of component becomes quite satisfactory for operating my novel fish clamping arrangement.

At the conclusion of the cleaning and/or descaling operation, the base member can be quickly removed from the table or bench, the length of chain gathered up, and all of these component including the greatly simplified foot pedal placed directly on a shelf or other storage location, or in a suitable small container such as of plastic or paper, such that it can be easily carried by the user on a clamping trip, fishing expedition, or the like.

It is therefore a primary object of my invention to provide a device into which the tail of a fish or a portion of a small animal carcass is quickly installable, which holds the fish or other animal suitably tightly for the cleaning and/or descaling or skinning thereof, and which device is highly effective and of low cost.

It is another object of this invention to provide a low cost foot operated device for holding the tail of a fish with as much force as necessary in order to immobilize the fish, which device is of compact size and readily usable by the average fisherman, with only minimal instruction as to its use being necessary.

It is still another object of this invention to provide a fish holding device of sufficiently sturdy construction as to enable the user to apply whatever force is necessary to hold the fish against undesired movement during descaling, yet being readily packageable into a very small volume for sale, storage and/or transport.

It is yet still another object of this invention to provide a low cost device that is highly effective for holding a fish to permit descaling, that does not require a special bench or table dedicated for its use, and that is readily installed upon, and thereafter readily removed therefrom, any of a wide range of tables, benches or other suitable mounting surfaces.

It is yet another object of this invention to provide a device for immobilizing a fish or animal carcass in a highly satisfactory manner as will permit cleaning and/or descaling, or skinning, yet allowing the user to have both hands free to place the fish or other animal in the position for clamping, and after cleaning, thereafter moving the fish or animal off the device such that another fish or animal can be immediately placed in position for the cleaning and/or descaling operation.

These and other objects, features and advantages will be more apparent as the description proceeds.

BRIEF DESCRIPTION OF DRAWINGS

FIG. 2 is a view showing means for applying a downward force to the U-shaped clamping component in accordance with this invention, this view revealing how this force applying means can be connected to the clamping component, such that a portion of a fish or game animal can be grasped and held with as much force as necessary;

FIG. 2a is a view of a typical "S" hook for establishing the active length of the tension member at the most appropriate location, considering table height;

FIG. 3 is a fragmentary view showing a slightly different embodiment of this invention, in that no indentation across the work surface is utilized, with which the clamping component interacts, with this view also showing details of a preferred return spring arrangement;

FIG. 4 is a view resembling FIG. 1, but here showing the movable clamping component having been caused to tightly clamp the tail of a fish to the work surface of the base member, such that the cleaning and descaling of the fish can proceed; and FIG. 4a is a cross-sectional view to a slightly larger scale, showing how the base portion of the clamping component and the notch across the face of the work surface effectively interact to grasp and hold a portion of the tail of a fish.

DETAILED DESCRIPTION

Figure 1A:
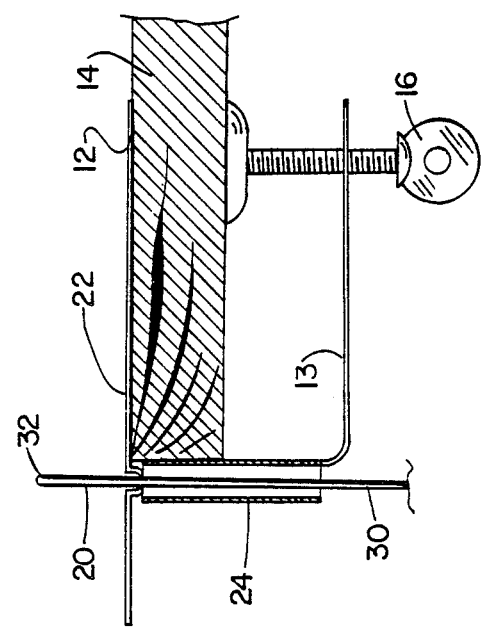
FIG. 1a is a fragmentary view showing details of one arrangement enabling my clamping fixture to be rapidly and removably secured to the edge of a table or bench, with this view also revealing an indentation across the work surface, with which the base of the U-shaped component interacts.
Figure 1:
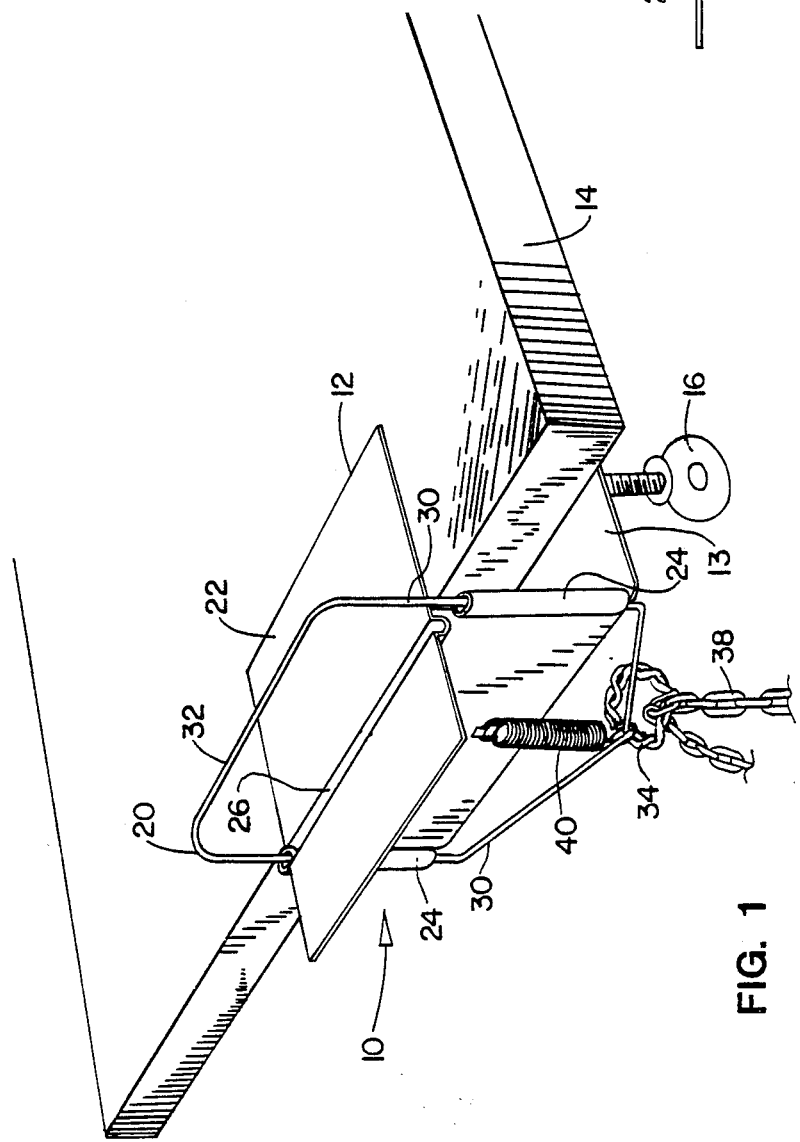
FIG. 1 is a perspective view of a preferred embodiment of a hands-free clamping fixture in accordance with my invention, showing my novel inverted U-shaped clamping component in the raised position with respect to the work surface, with the basic fixture being releasably secured to the edge of a table.

Turning first to FIG. 1 of the drawings, it will there be seen that I have illustrated a clamping fixture 10 for immobilizing a fish or animal to enable the cleaning and descaling or skinning thereof, which fixture comprises a base member 12, and a movable clamping component 20 interacting therewith. A work surface 22 is defined on the upper portion of base member 12, and it is upon this work surface that the tail or head of a fish, or a portion of an animal carcass is placed for cleaning.

To the underside of the base member 12 is joined a downwardly extending member 13, with the resulting configuration being such that my clamping fixture may be tightly yet releasably secured to the edge of a table 14 in the manner generally shown in FIG. 1a. Member 13 is generally "L" shaped, with its vertical leg normally resting closely up against the near edge of the table when my clamping fixture is in use, as is revealed in FIG. 1a. I prefer to use an aluminum extrusion in the construction of my basic device, such that the members 12 and 13 are of one-piece construction, but it is possible, however, to attach the member 13 to the underside of the flat upper member 12 by heliarc welding, riveting, or by other suitable means.

My clamping fixture may be removably affixed to the edge of a table or bench 14 by the use of a conventional thumb bolt 16, threadedly mounted in the lower member 13, so that the base member 12 will be tightly and effectively supported by the table or bench 14 while in use. In FIG. 1a it will be noted that the table upon which my fixture is mounted is considerably less thick than the maximum table thickness my device can accommodate. With regard to the detail revealed in FIG. 1a, however, it is to be understood that the specific manner in which the base member 12 is removably secured to the table or bench 14 is not of particular consequence to this invention.

Visible in FIG. 1, but more clearly to be seen in FIG. 2 are guide means 24, which are located on both sides of the work surface 22 defined upon the upper portion of the base member 12. These guide means may be independent components affixed to the base member 12 and the downwardly extending portion 13, but the guide means preferably are made from the aluminum out of which the lower portion of the member 13 is made, in that the guide means 24 may be created by bending the metal on each end of component 13 so as to form the two generally tubular, vertically disposed members. Quite obviously, however, I am not to be limited to this particular form of guide means.

The preferred form of movable clamping component 20 is of a generally U-shaped configuration, that has been inverted such that the arms 30 of the clamping component 20 extend downwardly from the base (uppermost portion) 32 of the inverted U-shaped clamping component, with such arms residing in a freely slidable manner in respective generally tubular guide means 24.

In the preferred embodiment, I define an indentation 26 in the nature of a groove or notch extending across the upper portion of the work surface 22, into which the base portion 32 of the inverted U-shaped clamping component may descend when the tail or head of a fish, or a portion of a game animal is to be grasped. Teeth 28 may be utilized in the groove 26 if desired, as shown in FIG. 2.

With regard to FIG. 2, it is to be noted that the movable clamping component or device 20 of inverted U-shaped construction defines an opening between the arms 30 and the base portion 32, and the work surface 22 as will enable the ready insertion of the tail or head of a fish, or a body portion of a fowl or mammal therebetween. In this important regard, my device is far superior to most prior art devices designed to clamp the tail of a fish, which devices usually have a very small opening into which the animal component can be inserted, and a considerable amount of hand force was involved in clamping the animal in the desired position. In my novel fixture, very little hand force is needed, and a return bias means preferably in the nature of a tension spring 40 is utilized for normally biasing the clamping component 20 to the open position illustrated in FIGS. 1 and 2.

FIGS. 2 and 3 reveal that the upper portion of the tension spring 40 is preferably attached to a hook formed on the lower portion 13 of the base member, whereas the lower end of the spring 40 is attached to the joinder point 34 at which the arms 30 come together at a common location to form a hole or loop.

Also attached to the joinder point 34 is the upper end of a tension member, preferably a chain 38, which is long enough to reach almost to the floor or ground under the table or bench 14. As is obvious, upon the user of my novel fixture affixing the appropriate link of the chain to the joinder location 34, and then causing the chain 38 to be pulled downwardly, the base or uppermost portion 32 of the inverted U-shaped clamping component is drawn forcefully into contact with the work surface 22 of the base member 12, to achieve clamping in a hands-free manner.

Turning now to FIG. 4, it will there be seen that as a result of the foot pedal making possible a strong downward pull on the chain 38, the teeth 36 of the movable clamping device 20 are caused to descend into forceful contact with the tail of a fish, or a suitable body portion of a fowl or mammal, with the user being able to supply enough downward force with his foot as to readily bring about the immobilization of the animal to be cleaned, and descaled or skinned as the case may be. It is important to realize that the user need not utilize more downward force than is necessary, however, thereby diminishing the risk of severing the body portion clamped upon the work surface 22 by the base 32 of the U-shaped component.

Even more important, however, is the fact that my novel, vertically movable clamping component or device can be operated in a hands-free mode, thus freeing up the hands of the user for placing the fish or carcass at the proper location for clamping, as well as making possible the prompt removal thereof after the cleaning and other operations have been completed, and thereafter, the immediate placement of the next animal in position. As is therefore obvious, the user can use both hands in performing these tasks, for my highly advantageous device makes it possible for the user to accomplish the clamping and unclamping of the game entirely by the use of the user's foot.

The foot pedal 50 in accordance with this invention may be of greatly simplified form, as shown in FIG. 2, thus making it easy to store or transport. As a matter of fact, the foot pedal 50 may be of a short length of metal, such as of aluminum, with a loop formed at one end such that it may be affixed to the lower end of chain 38. At the other end of the foot pedal I form a configuration such that the foot pedal can rest squarely on the floor, and by way of example, a loop 52 having a flattened portion may be formed at the lower end of the foot pedal, as is clearly visible in FIG. 2.

As should be obvious, and with reference to FIG. 2, the user of my device, after clamping or otherwise securing the base member 12 to the edge of a bench or table 14, proceeds to pay out enough of the chain 38 through the hole or opening at the joinder point 34 such that the lower end 52 of the foot pedal 50 rests on the floor or ground as the case may be, with the body of the foot pedal residing at an angle somewhere in the range between approximately 30° to the floor, and an angle of 60° to the floor, with an angle of approximately 45° usually being preferred. After the desired relationship of the foot pedal to the floor has been established, a member, preferably a "S" shaped hook 42 is slipped into the appropriate upper link of the chain, to prevent the chain being pulled back through the joinder point 34. A typical "S" hook is shown in FIG. 2a.

Returning to FIG. 3, it is to be noted that in this embodiment, the upper surface of the member 12 is flat rather than grooved, such that the base portion of the inverted U-shaped clamping component does not descend into a notch or groove. Preferably I use downwardly extending teeth 36 on this embodiment of the base member 32 of the U-shaped clamping component, which may interdigitate with upwardly extending teeth 26 located on the work surface 22 of the base member 12. By having the teeth on one member fit between the teeth 26 on the work surface of the base member, I have found that the game or fish is held quite tightly.

As should now be clear, upon the fisherman or hunter wishing to clean and descale or skin his catch, he inserts one end of the fish, fowl or mammal between the arms 30 of the clamping device and the work surface 22, at which time he then proceeds by foot action to clamp the game in a non-slip manner by the use of the base member 32 of the clamping component, which interacts very forcefully with the work surface 22 to prevent dislodgement of the animal during the cleaning and other preparations.

It is to be noted that if a chain is used as the tension member, the foot operated member 50 may be fastened tightly to one link of the chain, as shown in FIG. 2, and the "S" hook used as shown in FIG. 3, to prevent undesired pulling through of the chain through the loop 34. Alternatively, the two ends of S hook 42 may engage links of chain on opposite sides of loop 34 instead of the loop itself. As another option, an upper link of the chain may be affixed to the loop 34, and the foot operated member 50 attached to the appropriate lower link of the chain, taking table height into account in each of these situations.

I claim:

1. A hands-free clamping fixture for immobilizing a fish or animal carcass to enable the cleaning and/or descaling thereof, comprising a base member, and a movable clamping device interacting therewith, said base member having a work surface, said movable clamping device principally comprising a component of generally U-shaped configuration, said component having a base portion and a pair of arms, and being inverted such that said arms extend downwardly away from said base portion, means on each side of said base member for guiding said arms for vertical movement, and for preventing undesirable lateral displacement of said arms during such vertical movement and a foot operated device for causing the base portion of said inverted U-shaped component to selectively move into a tightly clamping relation with said work surface, so as to firmly grasp and hold a portion of fish or animal placed on said work surface, and spring bias means for causing the base portion of said component to return automatically to a release position when foot pressure on said foot operated device is sufficiently diminished.

2. The hands-free clamping fixture as defined in claim 1 in which said foot operated device involves a tension member utilized in conjunction with a foot pedal of small, compact size, such that the clamping of said base portion of said component against said work surface can be brought about at the behest of the user.

3. The hands-free clamping fixture as recited in claim 1 in which securing means are located on the underside of said base member, so that said clamping fixture can be tightly yet releasably secured to the edge of a table.

4. The hands-free clamping fixture as defined in claim 2 in which said tension member is a length of chain, and said foot pedal is an elongate member affixed at one end to the chain at a location just above the floor.

5. The hands-free clamping fixture as recited in claim 3 in which a chain is operatively associated with said foot operated device, the effective length of said chain being readily adjustable, such that the fixture can be used on tables of varying heights.

6. The hands-free clamping fixture as recited in claim 4 in which an indentation resides across the face of said work surface, said indentation being located directly below the base portion of said component, such that upon said foot pedal being depressed by a user, said base portion of said component can be moved into tightly clamping relationship with said indentation, such that a portion of a fish or animal residing therebetween will be tightly grasped.

7. The hands-free clamping fixture as recited in claim 6 in which said work surface has a set of spaced, upstanding teeth thereon, and said base portion of said component likewise has a set of spaced teeth, with the two sets of spaced teeth co-acting to grasp the fish or animal carcass very tightly at the time said component is caused by said foot pedal to descend.

8. A hands-free clamping fixture for immobilizing a fish or animal carcass to enable the cleaning and/or descaling thereof, comprising a base member, and a movable clamping device interacting therewith, said base member having a work surface, with guide means on each side of said work surface, said movable clamping device principally comprising a component of generally U-shaped configuration, said component having a base portion and a pair of arms, and being inverted such that said arms extend downwardly away from said base portion, said arms being guided by, and having a slidable relation with, said guide means on each side of said work surface, and foot operated means for causing the base portion of said inverted U-shaped component to move into a tightly clamping relation with said work surface, so as to firmly grasp and hold a portion of fish or animal placed on said work surface, and a spring for causing the base portion of said component to automatically return to a release position when foot pressure on said foot operated means has been sufficiently diminished.

9. The hands-free clamping fixture as defined in claim 8 in which said foot operated device involves a tension member utilized in conjunction with a foot pedal of small, compact size, such that the clamping of said base portion of said movable clamping device against said work surface can be brought about at the behest of the user.

10. The hands-free clamping fixture as recited in claim 8 in which securing means are located on the underside of said base member, so that said clamping fixture can be tightly yet releasably secured to the edge of a table.

11. The hands-free clamping fixture as defined in claim 9 in which said tension member is a length of chain, and said foot pedal is an elongate member affixed at one end to the chain at a location just above the floor.

12. The hands free clamping fixture as recited in claim 10 in which a chain is operatively associated with said foot operated device, the effective length of said chain being readily adjustable, such that the fixture can be used on tables of varying heights.

13. The hands-free clamping fixture as recited in claim 11 in which an indentation resides across the face of said work surface, said indentation being located directly below the base portion of said movable clamping device, such that upon said foot pedal being depressed by a user, said base portion of said movable clamping device can be moved into tightly clamping relationship with said indentation, such that a portion of a fish or animal residing therebetween will be tightly grasped.

14. The hands-free clamping fixture as recited in claim 13 in which said work surface has a set of spaced, upstanding teeth thereon, and said base portion of said movable clamping device likewise has a set of spaced teeth, with the two sets of spaced teeth co-acting to grasp the fish or animal carcass very tightly at the time said movable clamping device is caused by said foot pedal to descend.

15. A hands-free clamping fixture for immobilizing a fish or animal carcass to enable the cleaning and/or descaling thereof, comprising a base member, and a movable clamping device interacting therewith, said base member having a work surface, said movable clamping device principally comprising a base portion and at least one arm extending away from said base portion, means disposed adjacent at least one side of said base member for guiding said arm for vertical movement, and for preventing undesirable lateral displacement of said arm during such vertical movement, and foot operated means connected to said arm for causing, when actuated by downward foot pressure, said base portion to selectively move into a tightly clamping relation with said work surface, so as to firmly grasp and hold a portion of fish or animal placed on said work surface, said foot operated means utilizing a foot pedal and a length of chain, said length of chain directly interconnecting said foot pedal with said arm, such that downward motion of said foot pedal causes the fish or animal carcass to be tightly grasped.

16. The hands-free clamping device as recited in claim 15 in which an indentation extends across said work surface, with which said base portion can interact at the time said foot operated means is actuated, with teeth being utilized on at least said indentation to aid the firm grasping of a fish or animal.

* * * * *